United States Patent Office 2,972,543
Patented Feb. 21, 1961

2,972,543

CERAMIC GLAZE COMPOSITION

Malcolm D. Beals, Fanwood, and Karsten H. Styhr, Jr., Metuchen, N.J., assignors to National Lead Company, New York, N.Y., a corporation of New Jersey No Drawing. Filed Aug. 8, 1957, Ser. No. 676,942

4 Claims. (Cl. 106—48)

This invention relates to a ceramic glaze. More specifically, this invention relates to a white-opacified ceramic glaze, opacified and whitened with $TiO_2$. In particular, this invention relates especially to a self-opacified titania-containing glaze of the alkali boroalumino-silicate type. This application is a continuation-in-part of our application Serial No. 501,451, filed April 14, 1955, which is entitled "Ceramic Glaze Composition." Serial No. 501,451, now abandoned, is a continuation-in-part of our appliaction Serial No. 381,959, filed September 23, 1953, now abandoned.

To be useful in the coating of ceramic bodies a glaze must exhibit certain properties. It is necessary, first of all, that the glaze have a coefficient of thermal expansion similar to that of the substrate ceramic material; otherwise undue stresses will be set up during the cooling of the fired piece resulting in spalling, cracking, chipping or crazing. Aside from the necessary limitations on the coefficient of expansion other properties are desirable in a decorative glaze. Among these may be mentioned high opacity, gloss, durability at a low maturing temperature, and purity of color. Particularly in the case of a white glaze, a pure white color is to be desired. Such a base color lends itself readily to the production, if desired, of pastel shades by the addition of minor amounts of tinting agents to the formulation.

Among the opacifying agents heretofore used for the production of white glazes are ziraconia, $ZrO_2$, and tin oxide, $SnO_2$. These agents, while generally satisfactory, suffer from certain serious disadvantages, among which may be mentioned their high cost and relatively low opacifying power. Thus, when using $ZrO_2$ as the opacifying agent, it is customary to employ a glaze composition containing from 10 to 15 mole percent $ZrO_2$, and apply the same to the substrate material at an application weight of 60–70 grams per square foot. Similarly in the case of tin oxide glazes, it is usual to employ from 10 to 15 mole percent $SnO_2$, and apply the glaze at an application weight of 50–80 grams per square foot. With the titania-opacified glaze composition hereinafter described, on the other hand, a glaze containing even somewhat lower than 8 mole percent $TiO_2$ may be applied at a weight of 20 to 40 grams per square foot, and still give complete opacification.

The use of $ZrO_2$ and $SnO_2$, moreover, suffer from another disadvantage in that they are not adapted for use in the self-opacifying or "recrystallizing" type of glaze.

The disadvantages inherent in the use of $ZrO_2$ and $SnO_2$ opacifiers were overcome to some extent by the enamels disclosed in German Patent No. 688,787 (March 1, 1940), wherein was taught a high-alumina frit composition of the "recrystallizing" or self-opacified type, using titania as the opacifier. The enamels therein disclosed, however, also suffered from certain disadvantages, most notably the undesirably high solubility of $TiO_2$ in the vitreous matrix (which prompted the inventor to recommend incorporation of additional $TiO_2$ as a mill addition) and excessive fluidity of the glaze composition at ordinary maturing temperatures. These glazes were also subject to an undesirable tendency to craze on cooling of the fired article.

It is therefore an object of the present invention to provide an improved ceramic glaze. It is a further object to provide a ceramic glaze having a low coefficient of expansion, suitable for application to low-coefficient of expansion ceramic materials. A still further object is to provide a glaze having improved viscosity characteristics at maturing temperatures. An additional object is to provide a white ceramic glaze of high opacity. Still another object is to provide a durable, white, opaque ceramic glaze having a relatively low maturing temperature. Other objects and advantages will become apparent from the following more complete description and claims.

In its broader aspects this invention contemplates a ceramic glaze comprising $SiO_2$, $B_2O_3$, $TiO_2$, $Al_2O_3$ and fluxing oxides, said $Al_2O_3$ being present in amounts of at least 5 mole percent, said fluxing oxides being present in amount from 10 to 18 mole percent and selected from the group consisting of $Na_2O$ in amount no greater than 9 mole percent together with at least one of the oxides $K_2O$, $CaO$, $MgO$, $SrO$, $BaO$, $PbO$, $ZnO$, $Li_2O$, $CdO$ and $ZrO_2$.

In a particularly desirable embodiment, this invention contemplates a glaze of the type above described wherein said fluxing oxides comprise $Na_2O$ in amount from 4 to 9 mole percent and at least one oxide selected from the group consisting of $K_2O$ in amount up to 8 mole percent, $CaO$ in amount up to 4 mole percent, $SrO$ in amount up to 4 mole percent, $MgO$ in amount up to 8 mole percent, $BaO$ in amount up to 6 mole percent, $PbO$ in amount up to 6 mole percent, $ZnO$ in amount up to 10 mole percent, $Li_2O$ in amount up to 8 mole percent, $CdO$ in amount up to 4 mole percent and $ZrO_2$ in amount up to 4 mole percent.

In order for the $TiO_2$ to recrystallize properly during the final firing operation and give the desired whiteness and opacification, it is important that the $Al_2O_3$ content be at least 5 mole percent. Higher amounts of $Al_2O_3$, up to about 14 mole percent, may be employed if desired.

The quantities of $SiO_2$, $B_2O_3$ and $TiO_2$ are not critical and, as in other borosilicate glazes, may be varied within relatively wide limits, as will be understood to those skilled in the ceramic arts. In general, however, the $SiO_2$ will be in the range from 50 to 65 mole percent, $B_2O_3$ will be between 6 and 12 mole percent, and $TiO_2$ will be between 5 and 25 mole percent. It is preferred, however, to have the $TiO_2$ content between 5 and 16 mole percent, since amounts in this range give optimum $TiO_2$ particle size. Typical formulations with respect to the relative proportions of the oxides other than the fluxing oxide may be found for example in German Patent No. 688,787.

Another particularly desirable embodiment of the instant invention contemplates a glaze of the above type which further comprises from 1 to 2 mole percent of $P_2O_5$. Another embodiment is a glaze which further comprises from 1 to 5 mole percent $F_2$.

Throughout the above discussion, the percentages discussed are mole percentages based on the sum of the $SiO_2$, $B_2O_3$, $Al_2O_3$, $TiO_2$ and fluxing oxides.

A ceramic glaze having a composition as just described may be applied to common ceramic material such as whiteware bodies, terra cotta, earthenware and structural clay bodies and matured at temperatures in the neighborhood of 850–1050° C. to produce a highly opaque white glaze. The glaze is of the "recrystallizing" type by which is meant that it is pigmented by reprecipitation during the maturing heat of titania originally present as a melted-in constituent of the frit. It may be applied by preparing a frit having a composition within the ranges above specified, fusing the batch to provide complete intersolution, quenching in water and milling. The milled frit, usually with the addition of small amounts of clay and electrolytes, is applied to the ceramic substrate in any ordinary manner such as by dipping, brushing or spraying.

For optimum results, the proportions of the various constituents should be kept within the ranges above specified, to avoid certain undesirable results. For example, if the $Al_2O_3$ content is too low, the viscosity of the glaze in the maturing range is too low thus resulting in coarser $TiO_2$ particles in the glaze which reduce the opacity of the system. Moreover, if the total alkali content is appreciably higher than that specified, the glaze is excessively fluid and the recrystallized or precipitated particles of $TiO_2$ become larger than pigmentary size and tend to develop yellow color tones as well as decreasing the opacity of the glaze. If the total alkali is too low, on the other hand, the smelting temperature of the frit becomes excessively high and it becomes difficult or impractical to secure desirable frits at economical fritting temperatures. When the $Na_2O$, which is a very active flux, is too high, excessively high solubility of $TiO_2$ in the glaze results, as well as excessive fluidity in the glassy matrix. This results again in inadequate opacification, excessive particle size growth and consequent yellowing. Also, the use of high-soda fluxes tends to produce a glaze with a high coefficient of thermal expansion, which tends to cause crazing upon cooling of the fired article. Replacement of a portion of the soda with other fluxing oxides according to the present invention tends to reduce the coefficient of expansion and consequently the tendency of the glaze to craze on cooling. Such other fluxes are less violent and, therefore, do not affect the coefficient of expansion as much as an excess of $Na_2O$ does. Frits containing less than about 4.0 mole percent $Na_2O$, on the other hand, can be smelted only with difficulty and glazes which show poor flow characteristics on the ceramic substrate result so that poor surfaces are obtained on the fired specimens. Additions of $K_2O$, MgO, CaO and $Li_2O$ in amounts higher than those above specified tend to produce deleterious effects on the gloss of the fired glaze, while excessively large additions of BaO, PbO, $Li_2O$ or CdO all produce yellow colorations due to excessive particle growth of the reprecipitated $TiO_2$. Aside from the color and gloss effects, excessive amounts of alkali are further disadvantageous in that they reduce the acid resistance of the fired glaze, the acid resistance is normally excellent when the composition is kept within the specified ranges. In order to further illustrate the nature and use of glazes according to the present invention, the following examples are presented:

Example 1

A frit composition was prepared according to the preferred method by melting together for about 1½ hours at about 1550° C. a mixture of the following ingredients:

| | Parts by weight |
|---|---|
| High purity soda feldspar | 159.0 |
| Potter's flint | 47.5 |
| $TiO_2$ | 27.0 |
| Borax | 30.0 |
| Boric acid | 11.2 |

The calculated composition of the resulting frit, expressed in both mole and weight percentages, was as follows:

| Component | Mole Percent | Weight Percent |
|---|---|---|
| $SiO_2$ | 64.2 | 57.0 |
| $B_2O_3$ | 8.6 | 8.9 |
| $Al_2O_3$ | 8.6 | 12.9 |
| $TiO_2$ | 8.6 | 10.1 |
| $Na_2O$ | 6.0 | 5.5 |
| $K_2O$ | 4.0 | 5.6 |
| | 100.0 | 100.0 |

These components expressed in the Seger formula are as follows:

0.600 $Na_2O$     0.860 $B_2O_3$     6.420 $SiO_2$
0.400 $K_2O$      0.860 $Al_2O_3$    0.860 $TiO_2$
———
1.000

When complete intersolution was achieved, and the frit composition was clear, the frit was quenched in water. One hundred parts of this quenched frit were ball-milled for 18 hours along with 4 parts of clay, 0.25 part $NaNO_2$, 0.25 part of $K_2CO_3$ and 40 parts of demineralized water. The milled frit was then strained through a 200 mesh screen to insure the absence of any coarse particles. The strained slip was well-dispersed and of sprayable consistency.

The milled slip was then sprayed onto a bisqued wall tile panel at a dry application weight of about 30 grams per square foot, dried for 4 hours at 150° C. and then fired under oxidizing conditions (air atmosphere) at 1000° C. The kiln required about six hours to reach this temperature, and as soon as the maximum temperature was reached, heating was discontinued and the kiln was allowed to cool for 14 hours. The resulting glaze was smooth, glossy, continuous and of excellent white color.

Example 2

A frit was prepared according to substantially the same procedure as described in Example 1, using the following batch composition:

| | Parts by weight |
|---|---|
| Potter's flint | 160.0 |
| Alumina | 36.3 |
| $TiO_2$ | 28.5 |
| Borax | 67.8 |
| Soda ash | 8.9 |
| Magnesium carbonate | 30.7 |

Calculated oxide composition of the resulting frit was as follows:

| | Mole percent | Weight percent |
|---|---|---|
| $SiO_2$ | 61.4 | 57.2 |
| $B_2O_3$ | 8.2 | 8.9 |
| $Al_2O_3$ | 8.2 | 13.0 |
| $TiO_2$ | 8.2 | 10.1 |
| $Na_2O$ | 6.0 | 5.8 |
| MgO | 8.0 | 5.0 |
| | 100.0 | 100.0 |

These components expressed in the Seger formula are as follows:

0.429 $Na_2O$     0.586 $B_2O_3$     4.386 $SiO_2$
0.571 MgO         0.586 $Al_2O_3$    0.586 $TiO_2$
———
1.000

When intersolution was achieved and a clear solution obtained, the frit was quenched in water. This frit, after milling to minus 200 mesh was formed into a slip as described in Example 1 and was applied by spraying onto a bisqued tile slab at 30 pounds per square foot and after drying for 4 hours the slab was fired according to the procedure of Example 1 to a temperature of 950° C. and cooled to room temperature in 14 hours. The results obtained were similar to those described in Example 1.

*Example 3*

Another frit was prepared according to the same procedure described in Example 1 from the following ingredients:

| | Parts by weight |
|---|---|
| Potter's flint | 160.0 |
| Alumina | 29.7 |
| $TiO_2$ | 28.5 |
| Borax | 67.8 |
| Magnesite | 19.2 |
| Barium carbonate | 42.8 |

Composition of the resulting frit was as follows:

| | Mole percent | Weight percent |
|---|---|---|
| $SiO_2$ | 61.4 | 52.9 |
| $B_2O_3$ | 8.2 | 8.2 |
| $Al_2O_3$ | 8.2 | 12.0 |
| $TiO_2$ | 8.2 | 9.4 |
| $Na_2O$ | 4.0 | 3.6 |
| MgO | 5.0 | 2.9 |
| BaO | 5.0 | 11.0 |
| | 100.0 | 100.0 |

These components expressed in the Seger formula are as follows:

0.286 $Na_2O$      0.586 $B_2O_3$      4.386 $SiO_2$
0.357 MgO        0.586 $Al_2O_3$      0.586 $TiO_2$
0.357 BaO
———
1.000

When intersolution was complete the frit was quenched in water. The frit was then milled, made into a slip, sprayed onto a tile panel and dried according to the procedure described in Example 1. The dried tile panel was then fired to a temperature of 975° C. according to the procedure described in Example 1 and was cooled to room temperature over a period of 14 hours. The resulting glaze was smooth, continuous, glossy and possessed an excellent white color.

*Example 4*

A frit was prepared in the manner described in Example 1 using the following ingredients:

| | Parts by weight |
|---|---|
| Potter's flint | 168.0 |
| Alumina | 38.1 |
| $TiO_2$ | 30.0 |
| Borax | 71.2 |
| Soda ash | 8.5 |
| Potassium carbonate | 12.0 |
| Calcite | 17.3 |

Calculated oxide composition of the frit was as follows:

| | Mole percent | Weight percent |
|---|---|---|
| $SiO_2$ | 62.8 | 56.5 |
| $B_2O_3$ | 8.4 | 8.8 |
| $Al_2O_3$ | 8.4 | 12.8 |
| $TiO_2$ | 8.4 | 10.1 |
| $Na_2O$ | 6.0 | 5.6 |
| $K_2O$ | 2.0 | 2.8 |
| CaO | 4.0 | 3.4 |
| | 100.0 | 100.0 |

These components expressed in the Seger formula are as follows:

0.500 $Na_2O$      0.700 $B_2O_3$      5.233 $SiO_2$
0.167 $K_2O$       0.700 $Al_2O_3$     0.700 $TiO_2$
0.333 CaO
———
1.000

When intersolution was complete the frit was quenched in water. The frit was then milled, made into a slip, sprayed onto a bisqued whiteware and dried according to the procedure described in Example 1. The dried bisqued whiteware was then fired to a temperature of 1075° C. according to the procedure described in Example 1 and was cooled to room temperature over a period of 14 hours. A smooth, faultless, glossy, white and opaque glaze was produced similar to those previously described.

*Example 5*

A frit was prepared from the following ingredients using the procedure described in Example 1:

| | Parts by weight |
|---|---|
| Potter's flint | 163.5 |
| Alumina | 37.2 |
| $TiO_2$ | 29.2 |
| Borax | 69.5 |
| Soda ash | 1.0 |
| Red lead | 39.6 |
| Zinc carbonate | 22.8 |

Calculated oxide composition of the frit was as follows:

| | Mole percent | Weight percent |
|---|---|---|
| $SiO_2$ | 62.8 | 51.3 |
| $B_2O_3$ | 8.4 | 8.0 |
| $Al_2O_3$ | 8.4 | 11.6 |
| $TiO_2$ | 8.4 | 9.1 |
| $Na_2O$ | 4.0 | 3.4 |
| PbO | 4.0 | 12.2 |
| ZnO | 4.0 | 4.4 |
| | 100.0 | 100.0 |

These components expressed in the Seger formula are as follows:

0.333 $Na_2O$      0.700 $B_2O_3$      5.233 $SiO_2$
0.333 $K_2O$       0.700 $Al_2O_3$     0.700 $TiO_2$
0.333 CaO
———
1.000

When intersolution was complete the frit was quenched in water. The frit was then milled, made into a slip, sprayed onto a decorative terra cotta body and dried according to the procedure described in Example 1. The dried decorative terra cotta body was then fired to a temperature of 925° C. according to the procedure described in Example 1 and was cooled to room temperature over a period of 14 hours. The resulting glaze was again similar to that described in Example 1.

*Example 6*

The following ingredients were fused to form a frit according to the procedure described in Example 1.

| | Parts by weight |
|---|---|
| Potter's flint | 163.5 |
| Alumina | 37.2 |
| $TiO_2$ | 29.2 |
| Borax | 69.5 |
| Soda ash | 1.0 |
| Zinc carbonate | 45.5 |

The corresponding calculated oxide composition was:

|  | Mole percent | Weight percent |
|---|---|---|
| $SiO_2$ | 62.8 | 55.6 |
| $B_2O_3$ | 8.4 | 8.6 |
| $Al_2O_3$ | 8.4 | 12.6 |
| $TiO_2$ | 8.4 | 9.9 |
| $Na_2O$ | 4.0 | 3.7 |
| $ZnO$ | 8.0 | 9.6 |
|  | 100.0 | 100.0 |

These components expressed in the Seger formula are as follows:

0.333 $Na_2O$    0.700 $B_2O_3$    5.233 $SiO_2$
0.667 $ZnO$     0.700 $Al_2O_3$   0.700 $TiO_2$
─────
1.000

When intersolution was complete the frit was quenched in water. The frit was then milled, made into a slip, sprayed onto a terra cotta body and dried according to the procedure described in Example 1. The dried terra cotta body was then fired to a temperature of 925° C. according to procedure described in Example 1 and was cooled to room temperature over a period of 14 hours. Substantially the same results as in Example 1 were obtained.

Example 7

A frit was prepared according to the procedure described in Example 1 by mixing the following ingredients:

|  | Parts by weight |
|---|---|
| Potter's flint | 163.5 |
| Alumina | 37.2 |
| $TiO_2$ | 29.2 |
| Borax | 69.5 |
| Soda ash | 8.8 |
| Lithium carbonite | 19.3 |

The corresponding oxide composition was:

|  | Mole percent | Weight percent |
|---|---|---|
| $SiO_2$ | 62.8 | 58.6 |
| $B_2O_3$ | 8.4 | 9.1 |
| $Al_2O_3$ | 8.4 | 13.3 |
| $TiO_2$ | 8.4 | 10.4 |
| $Na_2O$ | 6.0 | 5.8 |
| $Li_2O$ | 6.0 | 2.8 |
|  | 100.0 | 100.0 |

These components expressed in the Seger formula are as follows:

0.500 $H_2O$    0.700 $B_2O_3$    5.233 $SiO_2$
0.500 $Na_2O$   0.700 $Al_2O_3$   0.700 $TiO_2$
─────
1.000

When intersolution was complete the frit was quenched in water. The frit was then milled, made into a slip, sprayed onto a terra cotta body and dried according to the procedure described in Example 1. The dried terra cotta body was then fired to a temperature of 925° C. according to the procedure described in Example 1 and was cooled to room temperature over a period of 14 hours. Substantially identical results to those of Example 1 were obtained.

Example 8

A frit was prepared using the procedure described in Example 1 by mixing the following ingredients:

|  | Parts by weight |
|---|---|
| Potter's flint | 160.5 |
| Alumina | 36.3 |
| $TiO_2$ | 28.5 |
| Borax | 68.0 |
| Soda ash | 4.8 |
| Potassium carbonate | 12.3 |
| Magnesite | 19.7 |
| Calcite | 9.1 |
| Barium carbonate | 17.4 |

Corresponding calculated oxide composition was:

|  | Mole percent | Weight percent |
|---|---|---|
| $SiO_2$ | 60.0 | 53.5 |
| $B_2O_3$ | 8.0 | 8.3 |
| $Al_2O_3$ | 8.0 | 12.1 |
| $TiO_2$ | 8.0 | 9.5 |
| $Na_2O$ | 5.0 | 4.6 |
| $K_2O$ | 2.0 | 2.8 |
| $CaO$ | 2.0 | 1.7 |
| $MgO$ | 5.0 | 3.0 |
| $BaO$ | 2.0 | 4.5 |
|  | 100.0 | 100.0 |

These components expressed in the Seger formula are as follows:

0.3125 $Na_2O$    0.500 $B_2O_3$    3.750 $SiO_2$
0.125  $K_2O$     0.500 $Al_2O_3$   0.500 $TiO_2$
0.3125 $MgO$
0.125  $CaO$
0.125  $BaO$
─────
1.000

When intersolution was complete the frit was quenched in water. The frit was then milled, made into a slip, sprayed onto a bisqued tile slag and dried according to the procedure described in Example 1. The dried bisqued tile slag was then fired to a temperature of 1075° C. according to the procedure described in Example 1 and was cooled to room temperature over a period of 14 hours. The resulting glaze was substantially identical in character with those described in the previous examples.

Example 9

A frit was prepared using the procedure described in Example 1 by mixing the following ingredients:

|  | Parts by weight |
|---|---|
| Potter's flint | 106.0 |
| $Na_2O \cdot Al_2O_3 \cdot 2SiO_2$ | 102.0 |
| $TiO_2$ | 29.0 |
| Boric acid | 41.2 |
| Cadmium carbonate | 30.0 |

Corresponding oxide composition:

|  | Mole percent | Weight percent |
|---|---|---|
| $SiO_2$ | 62.8 | 54.2 |
| $B_2O_3$ | 8.4 | 8.4 |
| $Al_2O_3$ | 8.4 | 12.3 |
| $TiO_2$ | 8.4 | 9.7 |
| $Na_2O$ | 6.0 | 5.3 |
| $K_2O$ | 2.0 | 2.7 |
| $CdO$ | 4.0 | 7.4 |
|  | 100.0 | 100.0 |

The components expressed in the Seger formula are as follows:

0.500 $Na_2O$   0.700 $B_2O_3$    5.233 $SiO_2$
0.167 $K_2O$    0.700 $Al_2O_3$   0.700 $TiO_2$
0.333 $CdO$
─────
1.000

When intersolution was complete the frit was quenched in water. The frit was then milled, made into a slip, sprayed onto an earthenware pottery body and dried according to the procedure described in Example 1. The dried earthenware pottery body was then fired to a temperature of 975° C. according to the procedure described in Example 1 and was cooled to room temperature over a period of 14 hours. The resulting glaze was similar to those described in the previous examples.

*Example 10*

A frit was prepared using the procedure described in Example 1 by mixing the following ingredients:

| | Parts by weight |
|---|---|
| Potter's flint | 163.5 |
| Alumina | 37.2 |
| $TiO_2$ | 29.2 |
| Borax | 69.5 |
| Soda ash | 22.0 |
| Zirconium dioxide | 16.5 |

Corresponding oxide compositions:

| | Mole percent | Weight percent |
|---|---|---|
| $SiO_2$ | 62.8 | 55.4 |
| $B_2O_3$ | 8.4 | 8.6 |
| $TiO_2$ | 8.4 | 9.8 |
| $Al_2O_3$ | 8.4 | 12.6 |
| $Na_2O$ | 9.0 | 8.2 |
| $ZrO_2$ | 3.0 | 5.4 |
| | 100.0 | 100.0 |

These components expressed in the Seger formula are as follows:

$$1.000\ Na_2O \quad 0.933\ B_2O_3 \quad 6.978\ SiO_2$$
$$0.933\ Al_2O_3 \quad 0.933\ TiO_2$$
$$0.333\ ZrO_2$$

When intersolution was complete the frit was quenched in water. The frit was then milled, made into a slip, sprayed onto a white ware tile panel and dried according to the procedure described in Example 1. The dried white ware tile panel was then fired to a temperature of 1075° C. according to the procedure described in Example 1 and was cooled to room temperature over a period of 14 hours. The glaze produced was similar to those described in the previous examples.

*Example 11*

A frit was prepared using the procedure described in Example 1 by employing the following mixture:

| | Parts by weight |
|---|---|
| Potter's flint | 120.0 |
| Alumina | 20.4 |
| $TiO_2$ | 32.0 |
| Anhydrous borax | 26.8 |
| $K_2CO_3$ | 23.0 |
| $NaNO_3$ | 28.3 |

The mixture had the following composition:

| | Mole percent | Weight percent |
|---|---|---|
| $SiO_2$ | 60.0 | 53.3 |
| $B_2O_3$ | 8.0 | 8.2 |
| $TiO_2$ | 12.0 | 14.2 |
| $Al_2O_3$ | 6.0 | 9.0 |
| $Na_2O$ | 9.0 | 8.3 |
| $K_2O$ | 5.0 | 7.0 |
| | 100.0 | 100.0 |

These components expressed in the Seger formula are as follows:

$$0.643\ Na_2O \quad 0.571\ B_2O_3 \quad 4.286\ SiO_2$$
$$0.357\ K_2O \quad 0.429\ Al_2O_3 \quad 0.857\ TiO_2$$
$$1.000$$

When intersolution was complete the frit was quenched in water. The frit was then milled, made into a slip, sprayed onto a ceramic tile and dried according to the procedure described in Example 1. The dried ceramic tile was then fired to a temperature of 975° C. according to the procedure described in Example 1 and was cooled to room temperature over a period of 14 hours. The glaze was similar in appearance and texture to that previously described in Example 1.

*Example 12*

A frit was prepared from the following mixture using the procedure described in Example 1:

| | Parts by weight |
|---|---|
| Potter's flint | 112.0 |
| Alumina | 34.0 |
| $TiO_2$ | 32.0 |
| Anhydrous borax | 26.8 |
| $K_2CO_3$ | 23.0 |
| $NaNO_3$ | 28.3 |

The mixture had the following composition:

| | Mole percent | Weight percent |
|---|---|---|
| $SiO_2$ | 56.0 | 48.6 |
| $B_2O_3$ | 8.0 | 8.0 |
| $TiO_2$ | 12.0 | 13.8 |
| $Al_2O_3$ | 10.0 | 14.7 |
| $Na_2O$ | 9.0 | 8.1 |
| $K_2O$ | 5.0 | 6.8 |
| | 100.0 | 100.0 |

The components expressed in the Seger formula are as follows:

$$0.643\ Na_2O \quad 0.571\ B_2O_3 \quad 4.000\ SiO_2$$
$$0.357\ K_2O \quad 0.714\ Al_2O_3 \quad 0.857\ TiO_2$$
$$1.000$$

When intersolution was complete the frit was quenched in water. The frit was then milled, made into a slip, sprayed onto a ceramic tile and dried according to the procedure described in Example 1. The dried ceramic tile was then fired to a temperature of 1050° C. according to the procedure described in Example 1 and was cooled to room temperature over a period of 14 hours. The glaze was similar in appearance and texture to that previously described in Example 1.

*Example 13*

Another frit was made with the following ingredients using the same procedure described in Example 1.

| | Parts by weight |
|---|---|
| Potter's flint | 124.1 |
| Alumina | 27.2 |
| $TiO_2$ | 29.3 |
| Anhydrous borax | 26.8 |
| $Na_2CO_3$ | 14.1 |
| Strontium carbonate | 14.8 |

These constituents were smelted according to Example 1 and the smelted composition was quenched in water. The frit had the following oxide composition:

|  | Mole percent | Weight percent |
|---|---|---|
| SiO$_2$ | 62.0 | 54.9 |
| B$_2$O$_3$ | 8.0 | 8.2 |
| Al$_2$O$_3$ | 8.0 | 12.0 |
| TiO$_2$ | 11.0 | 13.0 |
| Na$_2$O | 8.0 | 7.3 |
| SrO | 3.0 | 4.6 |
|  | 100.0 | 100.0 |

These constituents expressed in the Seger formula are as follows:

0.727 Na$_2$O    0.727 B$_2$O$_3$    5.636 SiO$_2$
0.273 SrO      0.727 Al$_2$O$_3$    1.000 TiO$_2$
―――
1.000

The frit formed was then ball milled, screened and dried according to the procedure of Example 1 using the same mill additions. The slip formed was then sprayed onto a tile body as in Example 1, dried and fired at 1050° C. for ½ hour and cooled to room temperature over a 14 hour period. The glaze was similar in appearance and texture to that previously described in Example 1.

*Example 14*

Another frit was prepared using the following ingredients:

| | Parts by weight |
|---|---|
| Potter's flint | 119.1 |
| Alumina | 27.2 |
| TiO$_2$ | 21.3 |
| Anhydrous borax | 26.8 |
| Soda ash | 33.6 |
| NaH$_2$PO$_4$·H$_2$O | 13.8 |

This mixture was smelted according to the procedure of Example 1 and quenched in water to form the frit. The frit had the following oxide composition:

|  | Mole percent | Weight percent |
|---|---|---|
| SiO$_2$ | 59.5 | 53.1 |
| B$_2$O$_3$ | 8.0 | 8.3 |
| Al$_2$O$_3$ | 8.0 | 12.1 |
| TiO$_2$ | 8.0 | 9.5 |
| Na$_2$O | 15.0 | 13.8 |
| P$_2$O$_5$ | 1.5 | 3.2 |
|  | 100.0 | 100.0 |

These constituents expressed in the Seger formula are as follows:

1.000 Na$_2$O    0.533 B$_2$O$_3$    3.967 SiO$_2$
               0.533 Al$_2$O$_3$    0.533 TiO$_2$
                                 0.100 P$_2$O$_5$

The frit was ball milled, screened, dried and sprayed onto a tile body in the same manner as that described in Example 1 and fired at 975° C. for 1 hour to mature the glaze. After cooling to room temperature in 14 hours, the glaze had the same appearance and texture as the glaze described in Example 1.

*Example 15*

Another frit was prepared using the following ingredients:

| | Parts by weight |
|---|---|
| Potter's flint | 118.1 |
| Alumina | 32.3 |
| TiO$_2$ | 18.6 |
| Anhydrous borax | 26.8 |
| Soda ash | 30.0 |
| NaF | 5.6 |

This mixture was smelted according to the procedure of Example 1 and quenched in water to form the frit. The frit had the following oxide composition:

|  | Mole percent | Weight percent |
|---|---|---|
| SiO$_2$ | 59.0 | 53.7 |
| B$_2$O$_3$ | 8.0 | 8.4 |
| Al$_2$O$_3$ | 9.5 | 14.7 |
| TiO$_2$ | 7.0 | 8.5 |
| Na$_2$O | 14.5 | 13.6 |
| F$_2$ | 2.0 | 1.1 |
|  | 100.0 | 100.0 |

These constituents expressed in the Seger formula are as follows:

1.000 Na$_2$O    0.551 B$_2$O$_3$    4.069 SiO$_2$
               0.655 Al$_2$O$_3$    0.483 TiO$_2$
                                 0.138 F$_2$

The frit was ground, screened, dried and sprayed onto a tile body in the same manner as that described in Example 1 and fired at 1000° C. for ½ hour to mature the glaze. The glaze produced had the same texture and appearance as the glaze produced in Example 1.

The ceramic glazes of the present invention may be applied to a wide variety of ceramic materials having coefficients of thermal expansion in the range characteristic of American wall tile. They are of excellent white color and opacity, and are characterized by good acid and alkali resistance. The glazes herein described, moreover, mature at relatively low temperatures, and thus help in the avoidance of warping or deformation of the substrate body at high temperatures. Being of "recrystallizing" variety, they provide the most efficient possible use of the titania opacifier and therefore give excellent opacification even at relatively low application weights.

While this invention has been described and illustrated by the examples shown, it is not intended to be strictly limited thereto, and other variations and modifications may be employed within the scope of the following claims.

We claim:

1. An opacified glaze composition containing as the opacifying agent recrystallized titanium dioxide, said glaze composition prepared by maturing a ceramic frit composition on a ceramic substrate, said glaze composition consisting essentially of SiO$_2$ in amount from 50 to 65 mole percent, B$_2$O$_3$ in amount from 6 to 12 mole percent, TiO$_2$ in amount from 5 to 25 mole percent, Al$_2$O$_3$ in amount from 5 to 14 mole percent, Na$_2$O in amount from 4 to 9 mole percent and at least one additional fluxing oxide selected from the group consisting of K$_2$O in amount up to 8 mole percent, CaO in amount up to 4 mole percent, MgO in amount up to 8 mole percent, BaO in amount up to 6 mole percent, SrO in amount up to 4 mole percent, PbO in amount up to 6 mole percent, ZnO in amount up to 10 mole percent, ZrO$_2$ in amount up to 5 mole percent, Li$_2$O in amount up to 8 mole percent, and CdO in amount up to 4 mole percent, the sum of said Na$_2$O and said additional fluxing oxide being from 10 to 18 mole percent.

2. A composition according to claim 1 in which the TiO$_2$ is present in amount from 5 to 16 mole percent.

3. A composition according to claim 1 in which the glaze also contains from 1 to 2 mole percent of P$_2$O$_5$.

4. A composition according to claim 1 in which the glaze also contains from 1 to 5 mole percent F$_2$.

References Cited in the file of this patent

UNITED STATES PATENTS

| 2,414,633 | Bryant | Jan. 21, 1947 |
| 2,483,393 | Baldwin | Oct. 4, 1949 |
| 2,640,784 | Tiede et al. | June 2, 1953 |
| 2,662,020 | Schofield et al. | Dec. 8, 1953 |
| 2,753,271 | Treptow | July 3, 1956 |